Patented Mar. 20, 1934

1,952,008

UNITED STATES PATENT OFFICE 1,952,008

EMULSIFYING DETERGENT AND WETTING AGENT

Herman Alexander Bruson, Philadelphia, Pa., assignor to The Resinous Products & Chemical Company, Philadelphia, Pa.

No Drawing. Application June 17, 1933, Serial No. 676,325

20 Claims. (Cl. 260—130)

This invention relates to a process for preparing wetting or emulsifying agents having soap-like properties, and has particular relation to a process for making soap-like materials which are readily soluble in dilute acids so that they can be used in aqueous acidic media as detergents, wetting agents or emulsifiers where the ordinary well known metallic soaps of fatty acids can not be used.

According to this invention, a primary amide of a monocarboxylic or dicarboxylic acid of the aliphatic, hydroaromatic or naphthenic acid series having more than eight carbon atoms, is heated with formaldehyde and a strongly basic secondary amine of the general formula

R—NH—R' where R and R' are each an alkyl group or jointly a polymethylene ring in which the sum total of the carbon atoms of R and R' is less than seven. Chemical combination occurs whereby a new compound is formed which, in contrast to the original amide, is readily soluble in dilute mineral or organic acids such as acetic acid to form soapy solutions which foam strongly when shaken.

The amines of the formula R—NH—R' given above which are operative in this process are the strongly basic secondary amines such as dimethylamine, diethylamine, dipropylamine, methylethylamine, diethanolamine, and piperidine; all of which have a carbon atom content less than seven. It has been found that other secondary amines notably dibutylamine, diamylamine, dibenzylamine, diphenylamine, N-methylaniline and the like, which have a carbon atom content higher than six are inoperative to condense properly in this process.

The amides which have been found suitable for the present process are the primary mono- and diamides of the saturated or unsaturated carboxylic acids having from 9 to 30 carbon atoms inclusive, it being understood that these amides can also be the crude mixtures commercially obtainable from natural or synthetic fatty glycerides, or from fatty acids or esters by direct amidation or that the amides can be the purified individual compounds. They may also contain other substituents in the acyl portion of their molecule such as aryl-, hydroxy-, alkoxy-, chloro-, keto-, amino-, or sulfonic acid groups.

Typical amides which are representative of those suitable for this process are the following:

Pelargonamide, lauric amide, myristamide, melissicamide, sebacic diamide, palmitic amide, arachidic amide, oleic amide, sulfonated oleic amide, ricinoleic amide, sulfonated ricinoleic amide, stearamide, 10-hydroxysteramide, 9, 10-dihydroxystearamide, linoleic amide, eleaostearic amide, carnaubic amide, cerotic amide, abietic amide, montanic amide, erucic amide, undecylenic amide, ω-benzoylnonylamide, 10-phenylstearamide, campholic amide, fencholic amide, naphthenic acid amide, cetyloxybutyramide, cetyloxyacetamide, 10-chlorstearamide, 10-aminostearamide, and the mixed amides of the fatty acids of cocoanut oil, castor oil, linseed oil, olive oil, tallow, rape seed oil, and the like.

The condensation of the amide, the formaldehyde, and the secondary amine is carried out by simultaneously heating the three components together, in molecular equivalent proportions, either in water, or more preferably in an inert, volatile organic solvent for the mixture, such as the volatile hydrocarbons or ethers, or else by first condensing the amide and the formaldehyde, and subsequently heating this condensate with the secondary amine preferably in an inert, organic solvent. The solvent can also be omitted and the above condensation carried out in an autoclave. When a diamide is used, the formaldehyde and the secondary amine must be used in at least double the molecular quantity with reference to the amide.

In general it is desirable to employ a slight excess of both the formaldehyde and the secondary amine over the amide. The optimum temperature of condensation is that at which only water is split out during the reaction. A suitable working temperature range is 85–115° C., although temperatures as low as 50° C. and as high as 150° C. can be used in some cases.

As catalysts for the reaction small amounts (.1–1%) of strongly basic substances such as trialkylamines (trimethylamine, triethylamine, and the like) or of metallic oxides, hydroxides, or carbonates are useful; these latter preferably of the alkali metals or of the alkaline earth metals such as sodium carbonate, sodium hydroxide, barium hydroxide, calcium oxide, potassium carbonate and the like.

Upon completion of the condensation and removal of solvents and excess formaldehyde and amines, the new products are obtained as waxy solids, jelly-like masses, or yellow liquids depending upon the amides used. Those made from high melting amides such as palmitic or stearic amides are hard or waxy masses, whereas the products prepared from oleic and lauric amides are soft, oily, or jelly-like substances. They dissolve readily in dilute aqueous acids such as acetic or lactic acid, or in dilute mineral acids (sulfuric, hydrochloric, etc.) especially on gentle warming to give foamy, soapy solutions which can be used as detergents, emulsifiers, or wetting agents depending upon the nature of the amide used for the condensation. These soapy solutions find use in cleaning and washing textile fibres and fabrics in an acid bath, for emulsifying fatty oils or hydrocarbons and water in acidic media, and as leveling agents and wetting agents in the dyeing and printing of rayon and other textiles. They may be admixed with sulfonated oils and sulfonated alcohols to produce special soaps.

The condensation described above is effectively carried out at ordinary pressure and at about 80–100° C. by the use of inert solvents such as benzol, toluol, and dioxane. Either aqueous or paraformaldehyde may be used. At the end of the reaction the solvent may be removed by evaporation and recovered whereupon the residue is either isolated directly or else neutralized with dilute acid and thereby converted to the water-soluble form. In some cases it is possible to use a water-soluble salt of the amine (for example, diethylamine hydrochloride) instead of the free amine in the condensation itself, and thus obtain directly the water soluble salt of the amide condensation product. In general, however, better results are obtained thru the use of the free secondary amine rather than its salts in the condensation reaction. The reaction can also be carried out in a closed system under pressure.

The primary amides mentioned herein can be obtained from the corresponding fatty acids by methods well known. However, I have found that some of these amides, especially those having more than 10 carbon atoms can be made more cheaply and easily without the use of acid chlorides or without the use of ammonia under pressure which ordinarily requires expensive high pressure equipment, by heating the carboxylic acid or its esters with an excess of urea at about 180–220° C. in ordinary open-mouth kettles at atmospheric pressure for about 5–6 hours and distilling the residue in vacuo. In this manner yields of 50–65% of theory and even higher in some cases are obtained. By using a closed autoclave the yields can be made almost theoretical.

*Example No. 1.*—(a) 5.66 grams of stearamide was mixed with 25 ccm. dioxane, 2.8 grams aqueous commercial dimethylamine solution (analyzing 41% dimethylamine, 0.4% monomethylamine and 3.8% trimethylamine) and 3 grams aqueous 30% formaldehyde solution. The mixture was heated on steam bath under a reflux condenser for 3 hours. The reaction mixture was then heated in vacuo on steam bath to completely remove the dioxane and excess of amine and of formaldehyde. A yellowish oil was obtained which rapidly crystallized on cooling to a pale yellow, waxy mass. The yield of product was practically quantitative (6.7 grams).

(b) 1 part of this waxy mass was dissolved in a solution of 30 parts water containing 1.5 parts glacial acetic acid by gently warming. It formed a soapy, foamy solution which is an excellent emulsifying agent for a mixture of kerosene and water giving a stable emulsion of the water-in-oil type.

*Example No. 2.*—A mixture of 5.8 grams stearamide, 0.8 gr. para-formaldehyde, 2 grams anhydrous diethylamine, and 25 ccm. benzol was heated under reflux for 3¼ hours. The benzene was then distilled off at atmospheric pressure on a steam bath. The residue was a waxy mass. It dissolved readily in dilute acetic acid or dilute sulfuric acid and such solutions either neutral or slightly acidic, were found to be excellent emulsifying agents for water with petroleum oils, cod oil and the like. The diethylamine can be replaced by an equivalent molecular amount of di-n-propylamine to give a similar reaction product.

*Example No. 3.*—A mixture of 6.2 gr. capryloxyacetamide,

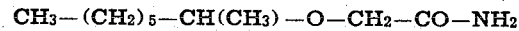

$CH_3-(CH_2)_5-CH(CH_3)-O-CH_2-CO-NH_2$ (a new compound which is a colorless crystalline material boiling at 147° C./2m.m.) together with 4 grams aqueous 30% formaldehyde, and 2.7 grams diethylamine in 20 grams dioxane as a solvent was boiled under reflux on a steam bath for 4 hrs. The solvent and excess amine were removed by heating in vacuo on a steam bath. A pale yellow thin oil was obtained which dissolved readily in dilute acetic acid solution to form a heavy foam when shaken.

*Example No. 4.*—A mixture of 5 grams oleic amide, 2.7 grams aqueous formaldehyde (30%), 2.8 grams aqueous dimethylamine solution (41%) and 20 ccm. dioxane was heated 4 hours on a boiling water bath under reflux. Upon removing the solvent and readily volatile products as described above, a pale yellow, rather heavy oil was obtained. It was readily soluble in dilute acids and such solutions were found to be excellent emulsifying agents for water in kerosene. The dimethylamine can be replaced by a molecular equivalent amount of diethylamine or methylethylamine to give a similar reaction product.

*Example No. 5.*—A mixture of 5 grams sebacic diamide, 6 gr. aqueous formaldehyde (30%), 4 grams aqueous diethylamine, and 20 grams dioxane was heated 4 hours at 100° C. under reflux. Upon working up the product as in Example 4, a very viscous sticky sirup was obtained which was readily dispersible in warm water to give an opalescent solution. Upon the addition of dilute acetic acid, the solution became clear and upon shaking gave a very heavy foam.

*Example No. 6.*—A mixture of 2.83 grams stearamide (.01 mol.), 1.5 grams aqueous formaldehyde (30%) 0.15 mol., 1.06 grams piperidine (.0125 mol.) and 10 ccm. dioxane was heated at 95–100° C. under reflux for 5 hours. The dioxane was then distilled off under reduced pressure on a steam bath. A hard, pale yellow wax was obtained. 1 gram of this wax dissolved readily in dilute acetic acid (1.5 ccm. glacial acetic acid plus 30 ccm. water) on gentle warming to give a foamy, opalescent solution. 1 ccm. of this solution added to a mixture of 5 ccm. kerosene plus 5 ccm. water and shaken, gives a stable emulsion of water in kerosene.

*Example No. 7.*—56 grams oleic acid and 30 grams urea were heated with stirring in an open vessel at 200–210° C. for 5 hours on an oil bath. The black asphalt-like mass obtained was washed with hot water and distilled in vacuum. Pure oleic amide came over as a colorless waxy mass boiling at about 200° C./1 m.m., 2.81 gr. of this oleic amide was mixed with 1.5 gr. aqueous formaldehyde (30%), and 1.26 gr. di-n-propylamine in 10 ccm. dioxane. The mixture was heated under a reflux condenser at 100° C. for 5 hrs., and the dioxane removed in vacuo. The residue was a pale yellow oil readily soluble in dilute acids. A solution was made by dissolving 1 gram of the product in a mixture of 30 ccm. water and 1.5 ccm. glacial acetic acid. 2 ccm. of this solution when shaken with a mixture of 10 ccm. water plus 5 ccm. kerosene gave a very stable emulsion of the "oil-in-water" type. Piperidine or disopropylamine can be used in place of the di-n-propylamine in the above example to give a similar product.

Example No. 8.—A mixture of 200 grams of urea and 200 gr. of the commercial mixed cocoanut oil fatty acids was heated with stirring in an open vessel at 200-210° C. for 5 hrs. The product was boiled several times with a large quantity of water to remove urea and cyanuric acid formed by decomposition. On cooling a dark hard wax was obtained. This was distilled in vacuo. It came over as a colorless crystalline waxy material boiling mostly at 180-200° C'/3 m.m. It represents the mixed amides of cocoanut oil acids. Yield 50% of theory. A mixture of 2.1 grams of the above distilled amide mixture, 2 gr. aqueous 30% formaldehyde, 2 gr. diethylamine and 10 ccm. dioxane was heated under reflux for 5 hrs. on steam bath. After removing the excess volatile reagents and dioxane in vacuo on steam bath, a pale yellow oil remained. It dissolves readily in dilute acetic acids to give very foamy solutions having marked emulsifying and wetting properties. It also combines with fatty acids such as oleic acid to give soaps which are soluble in hydrocarbons.

Example No. 9.—A mixture of 2.5 gr. naphthenic acid amide, 3 gr. aqueous 30% formaldehyde, 3 gr. diethylamine, and 10 ccm. dioxane was heated 7 hrs. under reflux. The volatile materials were them removed by heating in vacuo on a steam bath. The residue was a viscous oil which dissolved in dilute mineral acid to give a foamy, soapy solution. The naphthenic amide can be replaced by an equal weight of campholic amide.

Example No. 10.—A mixture of 2.1 gr. cocoanut oil mixed fatty acid amides, 2 gr. aqueous 30% formaldehyde, 3.3 gr. aqueous 41% dimethylamine solution, and 10 ccm. dioxane was heated 6 hrs. under reflux at 100° C. The product was worked up as described above. It formed a viscous yellow oil which dissolved readily in dilute acetic acid to give a foamy, soapy solution useful as a detergent.

Example No. 11.—A mixture of 2.1 gr. cocoanut oil mixed fatty acid amides and 2 gr. aqueous 30% formaldehyde in 5 cc. alcohol was heated with .01 gram sodium carbonate for 1 hr. on steam bath, the alcohol was evaporated off and the residue heated 1 hour at 100° C. with 3.3 gr. aqueous 41% dimethylamine solution. The reaction product was dissolved in 5% aqueous sulfuric acid and gave a clear, foamy solution having soap-like properties.

In the above examples the amides used may be replaced mole for mole by their acyl substituted derivatives of the type set forth herein such as their aryl-, hyroxy-, alkoxy-, keto-, amino-, chloro-, and sulfonic acid derivatives under the same conditions of operation to give acid-soluble soapy materials.

It is understood that the above examples are merely illustrative and are in no way to limit the invention since deviation in temperatures, proportions, methods of operation, etc., are possible, as will be recognized by one versed in the art, without departing from the spirit of the invention the scope of which is limited only by the following claims.

What I claim is:

1. A process for making soapy materials which comprises heating formaldehyde with a strongly basic secondary amine of the formula R—NH—R' where R and R' are each an alkyl group or jointly a polymethylene ring having a total carbon atom content less than seven, and a primary amide of a carboxylic acid which is one of the group consisting of aliphatic, hydroaromatic, and naphthenic acids having more than eight carbon atoms, at a temperature sufficient to split out water only.

2. A process as described in claim 1 in which the three combining components are heated in an inert, volatile solvent for the reaction mixture.

3. A process as described in claim 1 in which the reaction is conducted in the presence of a catalyst which is one of the group consisting of oxides, hydroxides and carbonates of metals belonging to the alkali group and alkaline earth group.

4. A process as described in claim 1 in which the reaction is conducted in the presence of a trialkylamine as a catalyst.

5. A modification of the process set forth in claim 1 in which the formaldehyde and the primary amide are first condensed to form a condensate which is subsequently heated with the secondary amine to split out water only.

6. A process for making soap-like materials which comprises heating formaldehyde with a strongly basic secondary amine having the general formula R—NH—R' where R and R' are an alkyl group or jointly a polymethylene ring having a total carbon atom content less than seven, and a primary amide of an aliphatic monocarboxylic acid having from 9 to 30 carbon atoms inclusive; at a temperature sufficient to split out water only.

7. A process as set forth in claim 1 in which the secondary amine used is one of the group consisting of dimethylamine, diethylamine, dipropylamine, diethanolamine and piperidine.

8. A process as set forth in claim 6 in which the primary amide used contains as a substituent in the acyl portion of its molecule one of the group consisting of aryl-, hydroxyl-, chloro-, amino-, keto-, alkoxyl- groups, and sulfonic acid groups.

9. A process for making an acid-soluble, soap-like product which comprises heating formaldehyde, dimethylamine, and stearamide, at a temperature sufficient to split out water only.

10. A process for making an acid-soluble soap-like product which comprises heating formaldehyde, dimethylamine, and oleic amide, at a temperature sufficient to split out water only.

11. A process for making an acid-soluble, soap-like product which comprises heating formaldehyde, dimethylamine, and the mixed amides of coconut oil fatty acids at a temperature sufficient to split out water only.

12. A process for making acid-soluble soap-like products which comprises heating formaldehyde, dimethylamine, and primary amides of fatty acids having more than 8 carbon atoms which are hydrolysis products of natural fatty glycerides.

13. A soap-like compound, soluble in dilute acids, said compound being a condensation product of formaldehyde, a strongly basic secondary amine of the general formula R—NH—R' where R and R' are an alkyl group or jointly a polymethylene ring having a total carbon atom content less than seven, and a primary amide of a carboxylic acid which is one of the group consisting of aliphatic, hydroaromatic, and naphthenic acids having more than eight carbon atoms.

14. A soap-like compound, soluble in dilute acids, said compound being a condensation product of formaldehyde, a strongly basic, secondary amine of the general formula R—NH—R' where R and R' are an alkyl group or jointly a polymethylene ring having a total carbon atom content less than seven, and a primary amide of an aliphatic monocarboxylic acid having from 9 to 30 carbon atoms inclusive.

15. A soap-like compound, soluble in dilute acids, said compound being a condensation product of formaldehyde, a dialkylamine, and oleic amide.

16. A soap-like compound soluble in dilute acids said compound being a condensation product of formaldehyde, a dialkylamine, and stearamide.

17. A soap-like compound, soluble in dilute acids, said compound being a condensation product of formaldehyde, dimethylamine, and oleic amide.

18. A soap-like compound, soluble in dilute acids, said compound being a condensation product of formaldehyde, dimethylamine, and stearamide.

19. A soap-like compound, soluble in dilute acids, said compound being a condensation product of formaldehyde, dimethylamine, and coconut oil mixed fatty acid amides.

20. A soap-like compound, soluble in dilute acids, said compound being a condensation product of formaldehyde, dimethylamine, and a primary amide of an aliphatic monocarboxylic acid having from 9 to 30 carbon atoms inclusive.

HERMAN ALEXANDER BRUSON.